(12) United States Patent
Oshima et al.

(10) Patent No.: US 6,730,727 B2
(45) Date of Patent: May 4, 2004

(54) COLORED RESIN WATER DISTRIBUTION PIPE

(75) Inventors: Kotaro Oshima, Inba District (JP); Toshimichi Sano, Narita (JP); Mitsuo Noda, Inba District (JP); Yasutaka Momoi, Ikoma (JP); Atsushi Nogami, Kawaguchi (JP); Toru Kawakami, Iwatsuki (JP); Takaaki Ota, Hatogaya (JP); Yoshio Abe, Iwatsuki (JP); Michiei Nakamura, Soka (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 266 days.

(21) Appl. No.: 10/021,712

(22) Filed: Dec. 12, 2001

(65) Prior Publication Data

US 2002/0099121 A1 Jul. 25, 2002

Related U.S. Application Data

(63) Continuation of application No. 09/090,171, filed on Jun. 3, 1998.

(30) Foreign Application Priority Data

Jun. 9, 1997 (JP) .............................. 9-166575
May 11, 1998 (JP) ............................ 10-127759

(51) Int. Cl.$^7$ .......................... B29D 22/00; C08K 3/22
(52) U.S. Cl. ...................... 524/430; 524/431; 524/432; 524/433; 428/36.9
(58) Field of Search ................... 524/430, 431, 524/432, 433; 428/36.9

(56) References Cited

U.S. PATENT DOCUMENTS

| 4,289,745 A | 9/1981 | Patil |
| 5,891,539 A | 4/1999 | Nakane et al. |

OTHER PUBLICATIONS

Müller, "Farbpräparationen beeinflussen Verarbeitungsparameter und Fertigteileigen–schaften", Kunststoffe, vol. 82, No. 9, pp. 767–770, 1992.

Smith, "Measurement of the Rate at which Pigments Disperse During Mixing", Powder Technology, vol. 5, No. 4, pp. 229–236, 1972.

Chemical Abstracts, vol. 125, No. 22, Columbus, Ohio, "Manufacture of Spherical Magnetic Transitional Microparticles for Magnetic Drawing White Boards", AN 125:291343, Nov. 1996 of JP 08 207114 A, Aug. 1996.

Database WPI, Section Ch, Week 9642, Derwent Publications Ltd., London, GB, AN 96–420822 of JP 08 207114 A, Aug. 1996.

Chemical Abstracts, vol. 105, No. 20, Columbus, Ohio, "Colored Crosslinked Polyethylene–Insulated Cables", AN 105:174038, Nov. 1986 of JP 61 133504 A.

Database WPI, Section CH, Week 8631, Derwent Publications Ltd., London, GB, AN 86–201134 of JP 61 133504, Jun. 1986.

Hawley's Condensed Chemical Dictionary, 11$^{th}$ Edition, p. 295.

*Primary Examiner*—Peter D. Mulcahy
(74) *Attorney, Agent, or Firm*—Frishauf, Holtz, Goodman & Chick, P.C.

(57) ABSTRACT

A colored resin water distribution pipe formed of a colored resin composition which comprises a polyolefin resin as a main component and a blue fine powder pigment of a composite oxide which comprises two or more metal oxides and has a spinel crystal structure and a BET specific surface area of about 30 m$^2$/g or more. The blue fine powder pigment is covered with an inorganic compound. The blue fine powder pigment is preferably treated mechanochemically by grinding. The colored resin water distribution pipe exhibits excellent resistance to water containing chlorine as a bactericide so that discoloration of the coloring component and formation of blisters on the inner face of the pipe by water containing chlorine are prevented.

25 Claims, No Drawings

COLORED RESIN WATER DISTRIBUTION PIPE

This is a continuation of Ser. No. 09/090,171 filed on Jun. 3, 1998.

BACKGROUND OF THE INVENTION

1. Field of the Invention

The present invention relates to a colored resin composition for water distribution pipes and a colored resin water distribution pipe comprising said composition, and more particularly to a colored resin composition for water distribution pipes which shows excellent fastness of the coloring component to water containing chlorine and a colored resin water distribution pipe comprising said composition.

2. Description of the Related Arts

Heretofore, water distribution pipes in Japan are pipes made of steel, ductile cast iron, or polyvinyl chloride. However, it was confirmed that water distribution pipes made of these materials showed formation of crazings and cracks by the earthquake which occurred in the HANSHIN-AWAJI area and were vulnerable to seismic deformation.

On the other hand, polyethylene pipes used as gas pipes or water distribution pipes showed little damage by formation of crazings and cracks in recent occurrences of earthquake, such as the earthquake in the sea off KUSHIRO, HOKKAIDO in January, 1993 (M: 7.8), the earthquake in the sea off the southwest coast of HOKKAIDO in July, 1993 (M: 7.8), and the earthquake in the HANSHIN-AWAJI area in January, 1995 (M: 7.2), and it was shown that polyethylene pipes have excellent resistance to seismic deformation. For water feed pipes made of polyethylene, LD polyethylene and LLD polyethylene are used as the material resin. Single layer pipes made of the above resin colored with carbon black and double layer pipes having an outer pipe made of the above resin colored with carbon black and an inner pipe made of the above resin without coloring are actually used. However, single layer pipes colored with a blue pigment are mainly used as water distribution pipes in the United States and Europe, and research and development on single layer pipes are being conducted in Japan with the prospect of using single layer pipes in future. The water distribution pipe refers to a main pipe used for distributing water from a water tower or a water pool to individual houses, and the water feed pipe refers to a pipe used for feeding water from the main pipe to terminals in individual houses.

As the pigment used for providing polyethylene with a blue color, a copper phthalocyanine blue pigment is generally used because of excellent weatherability. When pipes for water are provided with a color, it is essentially required that a used pigment show little discoloration in a test of resistance to water containing chlorine and that the inner face of the pipe do not show deformation, such as deformation caused by blisters. The copper phthalocyanine blue pigment show poor resistance to oxidizing agents and is markedly discolored in a test of resistance to water containing chlorine, resulting in almost white color.

SUMMARY OF THE INVENTION

Accordingly, the objects of the present invention are to provide a colored resin composition for water distribution pipes which is made of a polyolefin and comprises a blue pigment of a composite oxide showing excellent resistance to water containing chlorine as the bactericide so that the coloring component show excellent fastness of color to water containing chlorine and formation of blisters on the inner face of the pipe can be prevented; and to provide a pipe comprising this composition.

As the result of extensive studies by the present inventors to overcome the above problems, it was found that a colored polyolefin resin composition showing little discoloration or formation of blisters by water containing chlorine as the bactericide can be obtained by using, as the blue pigment for coloring a polyolefin resin, a blue fine powder pigment comprising a composite oxide which comprises oxides of two or more metals and has a crystal structure of a spinel type and a particular specific surface area or a blue pigment of a composite oxide treated with a compound. The present invention has been completed on the basis of this knowledge.

Accordingly, the present invention provides:

(1) A colored resin composition for water distribution pipes comprising a resin which comprises a polyolefin resin as a main component and a blue fine powder pigment of a composite oxide which comprises two or more metal oxides and has a spinel type crystal structure and a BET specific surface area of about 30 $m^2$/g or more;

(2) A colored resin composition for water distribution pipes comprising a resin which comprises a polyolefin resin as a main component and a blue pigment of a composite oxide which comprises two or more main metal oxides, has a spinel type crystal structure, and contains one or more elements other than metals of the main metal oxides in the crystal structure;

(3) A colored resin composition for water distribution pipes comprising a resin which comprises a polyolefin resin as a main component and a blue pigment of a composite oxide which comprises two or more main metal oxides, has a spinel type crystal structure, and has been treated with one or more compounds of elements other than metals of the main metal oxides mechanochemically by grinding;

(4) A composition described in any of (1), (2), and (3), wherein the blue pigment of a composite oxide is a composite oxide containing cobalt and aluminum as metals of the metal oxides;

(5) A composition described in any of (1), (2), (3), and (4), wherein the blue pigment of a composite oxide is a blue fine powder pigment of one composite oxide or a mixture of two or more composite oxides which are selected from the group consisting of composite oxides containing cobalt and aluminum as metal components, composite oxides containing cobalt, aluminum, and titanium as metal components, composite oxides containing cobalt, aluminum, and chromium as metal components, and composite oxides containing cobalt, aluminum, chromium, and titanium as metal components;

(6) A composition described in any of (1), (2), (3), (4), and (5), wherein the blue pigment of a composite oxide is obtained by dissolving salts of metals constituting the composite oxide in water, forming coprecipitates of compounds comprising oxides, hydroxides, and/or carbonates of the metals from the resultant solution using a precipitating agent, and baking the formed coprecipitates;

(7) A composition described in any of (1), (2), (3), (4), and (5), wherein the blue pigment of a composite oxide is obtained by dissolving salts of metals constituting the composite oxide and urea in water, forming coprecipitates of compounds comprising oxides, hydroxides, and/or carbonates of the metals by heating the resultant solution, and baking the formed coprecipitates;

(8) A composition described in any of (1), (2), (3), (4), (5), (6), and (7), wherein the blue pigment of a composite oxide is covered with a synthetic resin and/or an inorganic compound;

(9) A composition described in any of (1), (2), (3), (4), (5), (6), (7), and (8), wherein the polyolefin resin is a polyethylene resin; and

(10) A colored resin water distribution pipe comprising a colored resin composition described in any of (1), (2), (3), (4), (5), (6), (7), (8), and (9).

DESCRIPTION OF THE PREFERRED EMBODIMENTS

The resin used in the present invention which comprises a polyolefin resin as a main component is a conventional polyolefin resin used for extrusion molding or injection molding. Specific examples include homopolymers of ethylene and block copolymers of ethylene and propylene containing 1 to 50% by weight of ethylene and 99 to 50% by weight of propylene, which have a density of 0.91 to 0.980 g/cm$^3$, preferably 0.940 to 0.960 g/cm$^3$, and an MFR of 0.01 to 10.0 g/10 minutes, preferably 0.05 to 1.0 g/10 minutes. Block copolymers obtained by replacing a portion of ethylene or propylene in the above block copolymer with an olefin having 4 to 6 carbon atoms can also be used.

The present invention is described more specifically with reference to preferable embodiments.

The blue pigment used in the colored resin composition for water distribution pipes of the present invention is a blue pigment of a complex metal oxide, i.e., a blue calcined metal oxide complex pigment. This pigment is described in the following.

One of the blue pigments used in the colored resin composition for water distribution pipes is a blue pigment of a composite oxide which contains two or more metal oxides, has a spinel crystal structure, and comprises particles having a smaller size than that of ordinary pigments.

Examples of the blue pigment of a composite oxide include color index (hereinafter, referred to as C.I.) pigment blue 28 which is a blue pigment of a composite oxide containing cobalt and aluminum as the metal components and C.I. pigment blue 36 which is a blue pigment of a composite oxide containing cobalt, aluminum, and chromium as the metal components.

Characteristics of the blue pigments of a composite oxide are described in the following in accordance with the process for producing the pigments.

Conventional blue pigments of a composite oxide are produced in accordance with a dry synthesis process. In this process, the pigments are synthesized by mixing and baking oxides or other compounds of constituting metal components. Oxides, hydroxides, or carbonates of the constituting metal components are uniformly mixed together, and the obtained mixture is baked at a specific temperature of about 600° C. or higher in the presence of a flux. Rough grains of the sintered product are pulverized using a powerful grinding mill to prepare a pigment. The primary particles of the pigment are rough particles having an average diameter of about 0.8 to 1.0 µm and show inferior coloring ability. The pigment has a BET specific surface area of about 5 m$^2$/g.

In contrast, in a wet synthesis process, salts of cobalt, aluminum, and titanium and/or chromium as the constituting metal components are dissolved in water, and coprecipitates of oxides or compounds forming oxide by heat treatment, such as hydroxides and carbonates, are formed by adding a precipitating agent. The obtained coprecipitates are baked, and the baked product is pulverized to prepare a pigment. The obtained pigment has a BET specific surface area of about 30 to 120 m$^2$/g, and the primary particles of the pigment have an average diameter of about 0.3 µm or less.

In a new process which is referred to as a uniform precipitation process, salts of cobalt, aluminum, and titanium and/or chromium are dissolved in water in combination with urea, and coprecipitates of oxides, hydroxides, or carbonates are formed by heating the obtained solution. The coprecipitates are baked and pulverized to prepare a pigment. The obtained pigment has a BET specific surface area of about 40 to 120 m$^2$/g, and the primary particles of the pigment have an average particle diameter of about 0.1 µm or less.

As described above, the average particle diameter and the BET specific surface area are different depending on the process of synthesis. Blue pigments of composite oxides heretofore showed a coloring ability inferior to that of organic pigments because the pigments of composite oxides are inorganic pigments. However, the primary particles of the pigments prepared in accordance with the wet synthesis process or the uniform precipitation process have a remarkably smaller average diameter than that of the primary particles of the pigments prepared in accordance with the dry synthesis process. The BET specific surface area can be made as large as 6 to 20 times or more that of the conventional pigments. Therefore, the coloring ability and clarity as a pigment can be improved by using the above processes.

As the blue pigment of a composite oxide used in the present invention, a pigment having a BET specific surface area of 30 m$^2$/g or more is preferable when the pigment is selected with respect to the BET specific surface.

Preferable embodiments of the above wet synthesis process and the above uniform precipitation process are described in the following. As the salts of the constituting elements of the blue pigment of a composite oxide, any compounds conventionally used for producing pigments of a composite oxide, such as sulfates, nitrates, carbonates, chlorides, and acetates, can be used. It suitable that the aqueous solution of the mixed salts has a concentration of about 5 to 50% by weight. As the precipitating agent, sodium hydroxide, sodium carbonate, and sodium bicarbonate are suitably used.

The dried coprecipitates are baked in a oxidizing atmosphere at a temperature of 900 to 1,200° C. for 30 minutes to 1 hour to obtain a product having a completely spinel structure. The obtained blue pigment of a composite oxide is a composite oxide having a BET specific surface area of about 40 m$^2$/g or more.

Because the blue pigment of a composite oxide obtained above is a baked pigment, the pigment show a large resistance to oxidizing agents and excellent fastness of color to water containing chlorine which is the object of the present invention. Moreover, the pigment shows excellent heat resistance, light resistance, water resistance, chemical resistance, and solvent resistance.

In the present invention, a pigment of a composite oxide may be prepared by adding compounds, such as oxides, hydroxides, and carbonates, of one or more elements other than the elements of the main metal oxides to two or more main metal oxides constituting the pigment of a composite in the synthesis of the pigment, followed by baking the obtained mixture, for example, at a temperature of about 1,200° C. so that the elements other that the elements of the main metal oxides are diffused and introduced into the crystal of the composite oxide having the spinel structure. A pigment of a composite oxide may also be prepared by adding compounds, such as oxides, hydroxides, and carbonates, of one or more elements other than the elements of the main metal oxides to a composite oxide containing two or more main metal oxides which constitute the pigment of a composite oxide and have a spinel crystal structure in the synthesis of the pigment, followed by treating the obtained mixture mechanochemically by a method such as grinding. These pigments of a composite oxide can also be used. These blue pigments of a composite oxide show improved surface conditions and exhibits improved properties as the coloring agent, such as improved stability, fastness of color, and durability.

Examples of the compounds of the element other than the elements of the main metal oxides which are used in the above pigments include compounds of elements belonging to all Groups of the third period or higher of the Periodic Table excluding Groups 0, Ia, and VIIb. Specific examples of the preferable elements include aluminum, silicon, zinc, zirconium, titanium, tin, lanthanum, neodymium, and praseodymium. When these elements are added, oxides or hydroxides are preferably used. These elements are preferably used in an amount of about 1 to 20%. When the amount is less than this range, the effect is not exhibited. When the amount exceeds this range, the concentration of color decreases.

In the present invention, where necessary, the surface of the blue pigment of a composite oxide may be treated with one or more coating materials selected from the group consisting of inorganic compounds for surface treatment and synthetic resins. Examples of such inorganic compound for surface treatment include amorphous silica; glass materials having a low melting point; and compounds, such as hydroxides, oxides, and insoluble or hardly soluble salts such as carbonates, phosphates, and silicates, of metals of Group II of the Periodic Table such as magnesium, calcium, and zinc, metals of Group III such as aluminum, metals of Group IV such as titanium, zirconium, and tin, metals of Group VII such as iron, and rare earth elements such as lanthanum, praseodymium, and neodymium, and mixtures of these compounds. Examples of such synthetic resin include polymers which are substantially insoluble in the medium. This treatment improves dispersion and stability of the pigment and suppresses formation of blisters on the resin. When the surface treatment is conducted using the above inorganic compounds, such as hydroxides, oxides, and insoluble or hardly soluble salts of the metals, the blue pigment of a composite oxide shows improved surface conditions and exhibits improved properties as the coloring agent, such as improved stability, fastness of color, and durability.

The surface treatment with the inorganic compound for a surface treatment, such as hydroxides, oxides, and insoluble or hardly soluble salts of the metals and mixtures of these compounds, can be conducted in accordance with a conventional process for forming a coating layer of silica or hydroxides, oxides, and insoluble or hardly soluble salts of the metals described above. For example, when the surface treatment is conducted using silica, the coating layer can be obtained by, where necessary, treating the above blue pigment of a composite oxide with a silane coupling agent, dispersing the treated pigment finely in water, adding an aqueous solution of sodium silicate or potassium silicate and a dilute solution of sulfuric acid simultaneously, dropwise or as a flow, to the obtained dispersion, and mixing the components; or by dispersing the pigment finely in a solvent, such as ethanol containing water, adding tetraethyl orthosilicate or tetramethyl orthosilicate to the obtained dispersion, and allowing the hydrolysis reaction and the condensation reaction to proceed. When the surface treatment is conducted using a hydroxide of the above metal, the coating layer can be obtained by adding an aqueous solution of a salt of the metal soluble in water, such as chloride, sulfate, and acetate of the metal, and an alkali solution of sodium hydroxide or the like simultaneously, dropwise or as a flow, to form hydroxide of the metal. When the surface treatment is conducted using an oxide of the metal, the coating layer can be obtained by baking the hydroxide of the metal obtained above. When the surface treatment is conducted using an insoluble or hardly soluble salt of the metal, the coating layer can be obtained by adding an aqueous solution of a salt of the metal soluble in water, such as chloride, sulfate, and acetate of the metal, and a solution of sodium carbonate, sodium phosphate, or sodium silicate simultaneously, dropwise or as a flow, to form an insoluble or hardly soluble salt of the metal.

The coating treatment with a synthetic resin, such as a cured polymer or a polymer substantially insoluble in media, can be conducted in accordance with a conventional process for forming the synthetic resin.

As the cured polymer, conventional cured polymers are used. Examples of such cured polymer include cured amino resins, cured epoxy resins, cured phenol resins, cured urethane resins, crosslinked unsaturated polyester resins, and crosslinked poly(meth)acrylate resins. Polymers which are not cured can also be used as long as the polymer is substantially insoluble in the polyolefin resin or has a melting point higher than the working temperature of the resin. Examples of such polymer include polyamide resins, polyimide resins, and polyamideimide resins. As generally known, curable resins in the soluble condition, such as starting monomers and condensation products in early stages, can also be used, where necessary, in combination with suitable crosslinking agents, curing agents, catalysts, and polymerization initiators. Polymers which are not curable are used as a solution in a solvent.

The coating treatment can be conducted by, where necessary, treating the blue pigment of a composite oxide with a silane coupling agent, dispersing the treated pigment finely in water or a solvent, adding the above organic compound to the obtained dispersion in accordance with a conventional method for forming coating layers, for example, as an aqueous solution, an emulsion, or a solution in a solvent, dropwise or as a flow, heating the obtained mixture where necessary, and adding a curing agent such as an amine, a curing catalyst such as an acid and an alkali, or a polymerization initiator to the mixture.

It is necessary that the blue pigment of a composite oxide which has been treated on the surface contains the above inorganic compound or the above synthetic resin in an amount sufficient for coating the entire surface of the pigment. The inorganic compound or the synthetic resin is used for the treatment of the blue pigment of a composite oxide in an amount of 0.5 to 3,000 parts by weight per 100 parts by weight of the pigment. It is preferable that the inorganic compound is used in an amount of 1 to 50 parts by weight per 100 parts by weight of the pigment, and the synthetic resin is used in an amount of 5 to 2,000 parts by weight per 100 parts by weight of the pigment.

In the present invention, other pigments may be added to the above blue pigment of a composite oxide for the purpose of color matching. Examples of other pigments include organic pigments, such as phthalocyanine pigments, preferably brominated phthalocyanine blue pigments and phthalocyanine green pigments, azo pigments, preferably polycondensed azo pigments and azomethine azo pigments, isoindolinone pigments, quinacridone pigments, anthraquinone pigments, dioxazine pigments, and perylene pigments; pigments of a composite oxide having a color other than blue; and inorganic pigments, such as titanium oxide pigments, carbon black, ultramarine blue, and red oxide.

The blue pigment of a composite oxide is used in an amount of 0.001 to 20 parts by weight, preferably 0.01 to 10 parts by weight, per 100 parts by weight of the polyolefin. The above white pigments or the above colored pigments can be used singly or as a combination of two or more types.

In the colored resin composition of the present invention, a dispersant, such as a metal soap and polyethylene wax, is used to improve dispersion of the pigment. Examples of the metal soap include magnesium palmitate, calcium oleate, cobalt oleate, lithium stearate, magnesium stearate, zinc stearate, and calcium stearate.

As the polyethylene wax, polyethylene wax of various types, such as general polymerization types, decomposition types, and modification types, can be used.

The colored resin composition of the present invention may comprise, where necessary, anitoxidants, ultraviolet light absorbers, antistatic agents, antifungus agents, stabilizers, crosslinking agents, and inorganic fillers, such as talc, clay, silica, and alumina, in addition to the above components.

In an example of preparation of the colored resin composition for water distribution pipes, a blue pigment of a composite oxide, a dispersant, and where necessary, the other additives described above are mixed with a resin containing a polyolefin resin as the main component. The mixture is placed into a mixer (trade name, HENSCHEL MIXER; manufactured by MITSUI MIIKE SEISAKUSHO Co., Ltd.) and mixed at a room temperature or under heating. The mixed product is further mixed by passing through two heated rolls. The obtained mixture is cooled and then pulverized using a grinding mill to form pellets or extruded through an extruder to form beads or pillars.

The colored resin water distribution pipe of the present invention is produced by mixing a polyolefin resin with the above colored resin composition for water distribution pipes and, where necessary, other additives in accordance with a conventional practice and molding the obtained mixture into water distribution pipes having prescribed dimensions using an extruder.

To summarize the advantages obtained by the present invention, the colored resin composition for water distribution pipes shows excellent fastness of color in water containing chlorine and excellent durability without formation of blisters, and the water distribution pipe which is prepared by using this colored resin composition for water distribution pipes can maintain color and physical properties with stability in the use for a long period of time even when water is treated with a bactericide.

EXAMPLES

The present invention is described more specifically with reference to examples in the following.

Synthesis Example 1

Synthesis of a Blue Fine Powder Pigment of a Composite Oxide

Water was added to 41.4 parts by weight of aluminum nitrate nonahydrate, 16 parts by weight of cobalt nitrate hexahydrate, 60 parts by weight of urea, and 5,5 parts by weight of sodium sulfate, and the total amount was adjusted to 600 parts by weight. The components were stirred well so that the components were completely dissolved, and the obtained solution was heated while being stirred. When the temperature reached 100° C., the temperature was kept the same. Precipitates are separated after some time.

Small portions of the reaction solution were taken out for examination, and the reaction was completed when it was confirmed that a filtrate obtained from the reaction solution remained transparent after a dilute sodium hydroxide solution was added dropwise. After the reaction solution was filtered, the precipitates were washed with water to sufficiently remove soluble salts, and a filtration cake was obtained. The obtained cake of the coprecipitates was dried at a temperature of 120° C. for 12 hours or more. The dried coprecipitates were baked at 1,200° C. for 1 hour in an oxidizing atmosphere.

The blue fine powder pigment of a composite oxide comprising cobalt oxide and aluminum oxide thus obtained (BL-1) was composed of primary particles smaller than those obtained by the dry synthesis process. The diameters of the primary particles were 0.1 $\mu$m or less, and the BET specific surface area was 50 m$^2$/g. The pigment showed completely clear blue color with a reddish color tone in comparison with the color tone of the pigments prepared by the dry synthesis process. The coloring ability and dispersion were excellent.

Synthesis Example 2

Synthesis of a Blue Fine Powder Pigment of a Composite Oxide

Water was added to 41.4 parts by weight of aluminum nitrate nonahydrate, 16 parts by weight of cobalt nitrate hexahydrate, and 5,5 parts by weight of sodium sulfate, and the total amount was adjusted to 100 parts by weight. The components were stirred well so that the components were completely dissolved to prepare an aqueous solution of mixed salts. Separately, 25.7 parts by weight of sodium carbonate was dissolved in water, and the total amount was adjusted to 100 parts by weight to prepare an aqueous solution of sodium carbonate which was used as the precipitating agent.

Separately, 400 parts of water was placed in a vessel. The above aqueous solution of mixed salts and the above aqueous solution of sodium carbonate were simultaneously added dropwise to water in the vessel while the temperature was kept at 26° C., and the precipitation reaction was completed in about 30 minutes to 1 hour. During the reaction, pH was carefully kept at 12. The temperature of the reaction mixture was increased to 70° C., and the reaction mixture was aged for about 1 hour. After the reaction mixture was filtered, the precipitates were washed with water to completely remove soluble salts, and a filtration cake was obtained. The cake of coprecipitates was dried at a temperature of 120° C. for 12 hours or more, and the dried coprecipitates were baked at 1,200° C. for 1 hour in an oxidizing atmosphere.

The blue fine powder pigment of a composite oxide comprising cobalt oxide and aluminum oxide thus obtained (BL-2) was composed of primary particles smaller than those obtained by the dry synthesis process. The diameters of the primary particles were 0.1 $\mu$m or less, and the BET specific surface area was 40 m$^2$/g. The pigment showed completely clear blue color with reddish tone. The coloring ability and dispersion were excellent.

Synthesis Example 3
Synthesis of a Blue Pigment of a Composite Oxide, a Solid Solution of Oxides Type Aluminum oxide in an amount of 102.0 parts by weight, 63.7 parts by weight of cobalt oxide, and 5.0 parts by weight of titanium oxide were sufficiently mixed together by dry grinding. The obtained mixture was baked at 1,200° C. for 1 hour to obtain a blue pigment of a solid solution of titanium oxide and a composite oxide containing cobalt oxide and aluminum oxide (BL-3).

Synthesis Example 4
Synthesis of a Blue Pigment of a Composite Oxide, a Solid Solution of Oxides Type Aluminum oxide in an amount of 102.0 parts by weight, 63.7 parts by weight of cobalt oxide, 8.3 parts by weight of zinc oxide, and 5.0 parts by weight of titanium oxide were sufficiently mixed together by dry grinding. The obtained mixture was baked at 1,200° C. for 1 hour to obtain a blue pigment of a solid solution of zinc oxide, titanium oxide, and a composite oxide containing cobalt oxide and aluminum oxide (BL-4).

Synthesis Example 5
Preparation of a Mechanochemically Treated Blue Pigment of a Composite Oxide The blue pigment of a composite oxide comprising aluminum oxide and cobalt oxide (BL-1) in an amount of 165.7 parts by weight and 5.0 parts by weight of titanium oxide were sufficiently mixed together by dry grinding to make the components attached to each other mechanochemically. Thus, a blue pigment of a composite oxide comprising cobalt oxide and aluminum oxide which was mechanochemically treated with titanium oxide (BL-5) was obtained.

Synthesis Example 6
Preparation of a Mechanochemically Treated Blue Pigment of a Composite Oxide The blue pigment of a composite oxide comprising aluminum oxide and cobalt oxide (BL-2) in an amount of 165.7 parts by weight, 8.3 parts by weight of zinc oxide, and 5.0 parts by weight of titanium oxide were sufficiently mixed together by dry grinding to make the components attach to each other mechanochemically. Thus, a blue pigment of a composite oxide comprising cobalt oxide and aluminum oxide which was mechanochemically treated with zinc oxide and titanium oxide (BL-6) was obtained.

Synthesis Example 7
Surface Treatment of a Blue Fine Powder Pigment of a Composite Oxide with an Inorganic Coating Material The blue fine powder pigment of a composite oxide comprising cobalt oxide and aluminum oxide (BL-1) obtained in Example 1 in an amount of 50 parts by weight was wetted by addition of 100 parts by weight of a 10% by weight aqueous solution of methanol containing 1 part by weight of an anionic dispersant. To the wetted pigment, 400 parts by weight of water was added, and the mixture was sufficiently dispersed using an attriter containing steel balls until a uniform viscous slurry was obtained. The obtained slurry was passed through a net to remove steel balls and diluted with water to adjust the total amount to 1,000 parts by weight.

Separately, 16.7 parts by weight of an aqueous solution of sodium silicate (30% by weight as anhydrous silicic acid) was diluted with water to adjust the total amount to 100 parts by weight. A 2.5% by weight aqueous solution of sulfuric acid in an amount of 100 parts by weight was separately kept ready for use.

The dispersion of the pigment was heated to 90° C., and pH of the dispersion was adjusted to 10.0 by addition of a dilute aqueous solution of sodium hydroxide. To this dispersion, the above dilute aqueous solution of sodium silicate and the above dilute aqueous solution of sulfuric acid were added dropwise. The addition was controlled so that the reaction mixture was kept alkaline. After the addition of both solutions was completed, the reaction mixture was kept being stirred for 1 hour and then adjusted to a pH of 6.5 to 7.0 by addition of a dilute sulfuric acid. After the obtained slurry was filtered, the precipitates were washed with water until the absence of soluble salts was confirmed and dried to obtain 55 parts by weight of a blue fine powder pigment of a composite oxide treated on the surface (BL-7). The amount of silica coating the surface was about 10% by weight based on the amount of the pigment.

Synthesis Example 8
Surface Treatment of a Blue Fine Powder Pigment of a Composite Oxide with an Inorganic Coating Material The blue fine powder pigment of a composite oxide comprising cobalt oxide and aluminum oxide (BL-1) in an amount of 300 parts by weight was added to 1,000 parts by weight of water containing 0.9 parts by weight of sodium hexametaphosphate. The obtained mixture was stirred using a homomixer for 30 minutes to deflocculate and disperse the pigment sufficiently.

Separately, 14.5 parts by weight of sodium aluminate was dissolved into 200 parts by weight of water to prepare a dilute solution of sodium aluminate. Sulfuric acid in an amount of 10.1 parts by weight was added to 200 parts by weight of water to prepare a dilute aqueous solution of sulfuric acid.

The above dispersion of the pigment was heated to 60° C., and pH of the dispersion was adjusted to 9.0 by addition of a dilute aqueous solution of sodium hydroxide. To this dispersion, the above aqueous solution of sodium aluminate and the above dilute aqueous solution of sulfuric acid were simultaneously added dropwise. The addition was controlled so that the reaction mixture was kept alkaline. After the addition of both solutions was completed, the reaction mixture was kept being stirred for 1 hour for aging. After the obtained slurry was filtered, the precipitates were washed with water until the absence of soluble salts was confirmed by the measurement of electric conductivity of the filtrate and dried to obtain 310 parts by weight of a blue fine powder pigment of a composite oxide treated with aluminum hydroxide on the surface (BL-8). The amount of aluminum hydroxide coating the surface was about 4.6% by weight based on the amount of the pigment.

Synthesis Example 9
Surface Treatment of a Blue Fine Powder Pigment of a Composite Oxide with an Inorganic Coating Material The blue fine powder pigment of a composite oxide comprising cobalt oxide and aluminum oxide (BL-1) in an amount of 300 parts by weight was added to 1,000 parts by weight of water containing 0.9 parts by weight of sodium hexametaphosphate. The obtained mixture was stirred to deflocculate and disperse the pigment.

Separately, 31.3 parts by weight of an aqueous solution of sodium silicate (29% as anhydrous silicic acid) was added to 200 parts by weight of water to prepare a dilute solution of sodium silicate. Sulfuric acid in an amount of 4.2 parts by weight was added to 200 parts by weight of water to prepare a dilute aqueous solution of sulfuric acid. The above dispersion of the pigment was heated to 80° C., and pH of the dispersion was adjusted to 9.5 by addition of a dilute aqueous solution of sodium hydroxide. To this dispersion, the above aqueous solution of sodium silicate and the above dilute aqueous solution of sulfuric acid were simultaneously added dropwise. After the addition was completed, the reaction mixture was kept being stirred for 1 hour for aging.

Separately, a dilute solution of sodium aluminate containing 14.5 parts by weight of sodium aluminate and a dilute aqueous solution of sulfuric acid containing 10.1 parts by weight of sulfuric acid were prepared in accordance with the same procedures as those conducted in Synthesis Example 8. The dispersion of the pigment treated above was heated to 60° C., and the above dilute aqueous solution of sodium aluminate and the above dilute aqueous solution of sulfuric acid were simultaneously added dropwise to this dispersion at a pH of 9.0. After the addition of both solutions was completed, the reaction mixture was kept being stirred for 1 hour for aging. After the obtained slurry was filtered, the precipitates were washed with water and dried to obtain 319 parts by weight of a blue fine powder pigment of a composite oxide treated on the surface with double layers of silica and aluminum hydroxide (BL-9). The total amount of silica and aluminum hydroxide coating the surface was about 7.6% by weight based on the amount of the pigment.

Synthesis Example 10
Surface Treatment of a Blue Fine Powder Pigment of a Composite Oxide with an Inorganic Coating Material The blue fine powder pigment of a composite oxide comprising cobalt oxide and aluminum oxide (BL-1) in an amount of 300 parts by weight was added to 1,000 parts by weight of water containing 0.9 parts by weight of sodium hexametaphosphate in accordance with the same procedures as those conducted in Synthesis Example 9. The obtained mixture was stirred to deflocculate and disperse the pigment. Separately, 31.3 parts by weight of an aqueous solution of sodium silicate (29% as anhydrous silicic acid) was added to 200 parts by weight of water to prepare a dilute solution of sodium silicate. Sulfuric acid in an amount of 4.2 parts by weight was added to 200 parts by weight of water to prepare a dilute aqueous solution of sulfuric acid. The above dispersion of the pigment was heated to 80° C., and pH of the dispersion was adjusted to 9.5 by addition of a dilute aqueous solution of sodium hydroxide. The above aqueous solution of sodium silicate and the above dilute aqueous solution of sulfuric acid were simultaneously added dropwise to this dispersion. After the addition of both solutions was completed, the reaction mixture was kept being stirred for 1 hour for aging. Separately, a dilute solution of sodium aluminate containing 14.5 parts by weight of sodium aluminate and a dilute aqueous solution of sulfuric acid containing 10.1 parts by weight of sulfuric acid were prepared in accordance with the same procedures as those conducted in Synthesis Example 9. The dispersion of the pigment treated above was heated to 60° C., and the above dilute aqueous solution of sodium aluminate and the above dilute aqueous solution of sulfuric acid were simultaneously added dropwise to this dispersion at pH of 9.0. After the addition of both solutions was completed, the reaction mixture was kept being stirred for 1 hour for aging.

Separately, 31.8 parts by weight of zinc sulfate heptahydrate was dissolved in 200 parts by weight of water to prepare a dilute aqueous solution of zinc sulfate, and 8.8 parts by weight of sodium hydroxide was dissolved in 200 parts by weight of water to prepare a dilute aqueous solution of sodium hydroxide. The dispersion of the pigment treated above was heated to 60° C., and the above dilute aqueous solution of zinc sulfate and the above dilute aqueous solution of sodium hydroxide were simultaneously added dropwise to this dispersion while the speed of addition was adjusted so that pH of the reaction mixture was kept at 7. After the addition of both solutions was completed, the reaction mixture was kept being stirred for 1 hour for aging. After the obtained slurry was filtered, the precipitates were washed with water and dried to obtain 330 parts by weight of a blue fine powder pigment of a composite oxide treated on the surface with multiple layers of silica, aluminum hydroxide, and zinc hydroxide (BL-10). The total amount of silica, aluminum hydroxide, and zinc hydroxide coating the surface was about 11.3% by weight based on the amount of the pigment.

Synthesis Examples 11 to 14

The blue pigments of a composite oxide shown in Column 3 of Table 1 were treated on the surface with the inorganic coating materials shown in Table 1 in accordance with the same procedures as those conducted in Synthesis Example 9 or 10 to obtain pigments treated on the surface (BL-11 to BL-14).

TABLE 1

| Synthesis Example | 11 | 12 | 13 | 14 |
|---|---|---|---|---|
| Synthesis Example of the reference | 9 | 9 | 10 | 10 |
| Blue pigment of a composite oxide used for the treatment | BL-4 | BL-6 | BL-3 | BL-5 |
| amount (part by weight) | 300 | 300 | 300 | 300 |
| Inorganic coating material (amount, % by weight per weight of pigment) | | | | |
| silica | 3.0 | 3.0 | 3.0 | 3.0 |
| aluminum hydroxide | 4.6 | 4.6 | 4.6 | 4.6 |
| zinc hydroxide | — | — | 3.7 | 3.7 |
| total amount of coating materials | 7.6 | 7.6 | 11.3 | 11.3 |
| Blue pigment of a composite oxide treated on the surface | BL-11 | BL-12 | BL-13 | BL-14 |

Synthesis Example 15
Surface Treatment of a Blue Fine Powder Pigment of a Composite Oxide with an Organic Coating Material The blue fine powder pigment of a composite oxide prepared in Synthesis Example 1 (BL-1) in an amount of 10 parts by weight, 40 parts by weight of bisphenol A diacrylate modified with ethylene oxide, 30 parts by weight of trimethylolpropane triacrylate, and 20 parts by weight of stearyl methacrylate were mixed together and uniformly dispersed using a roll mill. To the obtained mixture, 0.8 parts by weight of azobisisobutyronitrile as the polymerization initiator was added and mixed together. The resultant mixture was added to 200 parts by weight of a 2.5% aqueous solution of polyvinyl alcohol which was stirred by a high speed stirrer to prepare a suspension of an oil in water type having an average diameter of particles of about 3 μm. The prepared suspension was placed in an apparatus for suspension polymerization together with 200 parts by weight of a 2.5% aqueous solution of polyvinyl alcohol, and the polymerization was allowed to proceed at 75 to 80° C. for 8 hours while being stirred. After the slurry of the suspension obtained by the polymerization was filtered, the precipitates were washed and dried to obtain a blue fine powder pigment of a composite oxide treated on the surface (BL-15). The content of the pigment was 10%, and the average particle diameter was about 3 μm.

Blue pigments of a composite oxide BL-4 and BL-6 were coated with organic coating materials on the surface in accordance with the same procedures as those conducted in Synthesis Example 15, and blue pigments of a composite oxide treated on the surface BL-16 and BL-17, respectively, were obtained. Both pigments had a content of the pigment of 10% and an average particle diameter of about 3 µm.

Example 1

A high density polyethylene (density, 0.949 g/cm$^3$; MFR, 0.10 g/10 minutes) in an amount of 100 parts by weight, 0.2 parts by weight of the blue fine powder pigment of a composite oxide BL-1 obtained in Synthesis Example 1, and 0.1 part by weight of a polyethylene wax (trade name, SUNWAX 151P; manufactured by SANYO KASEI KOGYO Co., Ltd.) were kneaded together using a two roll mill at 185° C. for 2 minutes to obtain a colored resin composition for water distribution pipes.

Then, the kneaded product was pressed under heating to prepare a pressed sheet having a thickness of 2 mm. The pressed sheet was prepared under the condition of preheating at 230° C. for 2 minutes (20 kg/cm$^2$), pressing at 230° C. for 2 minutes (200 kg/cm$^2$), and cooling at 20° C. for 5 minutes. Test pieces of 20 mm×120 mm were prepared from the obtained pressed sheet.

Using the prepared test pieces, discoloration and formation of blisters were examined in accordance with the test method of resistance to water containing chlorine. The results showed excellent fastness of color with little discoloration and excellent durability with respect to the formation of blisters.

Colored resin compositions for water distribution pipes were prepared by using 0.2 parts by weight of BL-2, BL-3, BL-4, BL-5, or BL-6, 0.22 parts by weight of BL-7, 0.209 parts by weight of BL-8, 0.215 parts by weight of BL-9, BL-11, or BL-12, 0.223 parts by weight of BL-10, BL-13, or BL-14, or 2 parts by weight of BL-15, BL-16, or BL-17 in place of BL-1 used in the above, and discoloration and formation of blisters were examined in accordance with the test method of resistance to water containing chlorine in accordance with the same procedures as those described above. The results of the tests showed excellent fastness of color and excellent durability with respect to the formation of blisters.

Example 2

A colored resin composition for water distribution pipes was prepared in accordance with the same procedures as those conducted in Example 1 except that 0.1 part by weight of calcium stearate was used in place of polyethylene wax used in Example 1. Test pieces were prepared from the prepared colored resin composition, and discoloration and formation of blisters were examined in accordance with the same procedures as those conducted in Example 1. The results showed excellent fastness of color with little discoloration and excellent durability with respect to the formation of blisters.

Colored resin compositions for water distribution pipes were prepared by using BL-2 to BL-16 in place of BL-1 used in the above, and discoloration and formation of blisters were examined in accordance with the test method of resistance to water containing chlorine in accordance with the same procedures as those described above. The results of the tests showed excellent fastness of color and excellent durability with respect to the formation of blisters.

Example 3

A high density polyethylene (density, 0.949 g/cm3; MFR, 0.10 g/10 minutes) in an amount of 100 parts by weight, 0.2 parts by weight of the blue fine powder pigment of a composite oxide BL-1 obtained in Synthesis Example 1, 0.002 part by weight of titanium oxide (trade name, TIPAKE CR90; manufactured by ISHIHARA SANGYO Co., Ltd.), and 0.11 part by weight of a polyethylene wax (trade name, SUNWAX 151P) were kneaded together using a two roll mill at 185° C. for 2 minutes to obtain a colored resin composition for water distribution pipes.

Then, the kneaded product was pressed under heating to prepare a pressed sheet having a thickness of 2 mm. The pressed sheet was prepared under the condition of preheating at 230° C. for 2 minutes (20 kg/cm$^2$), pressing at 230° C. for 2 minutes (200 kg/cm$^2$), and cooling at 20° C. for 5 minutes. Test pieces of 20 mm×120 mm were prepared from the obtained pressed sheet.

Using the prepared test pieces, discoloration and formation of blisters were examined in accordance with the same procedures as those conducted in Example 1. The results showed excellent fastness of color with little discoloration and excellent durability with respect to the formation of blisters.

Colored resin compositions for water distribution pipes were prepared by using BL-2 to BL-16 in place of BL-1 used in the above, and discoloration and formation of blisters were examined in accordance with the test method of resistance to water containing chlorine in accordance with the same procedures as those described above. The results of the tests showed excellent fastness of color and excellent durability with respect to the formation of blisters.

Example 4

A high density polyethylene (density, 0.949 g/cm3; MFR, 0.10 g/10 minutes) in an amount of 100 parts by weight, 0.223 parts by weight of the blue fine powder pigment of a composite oxide obtained in Synthesis Example 10, 0.001 part by weight of copper phthalocyanine green pigment, and 0.101 parts by weight of a polyethylene wax (trade name, SUNWAX 151P) were kneaded together using a two roll mill at 185° C. for 2 minutes to obtain a colored resin composition for water distribution pipes.

Then, the kneaded product was pressed under heating to prepare a pressed sheet having a thickness of 2 mm. The pressed sheet was prepared under the condition of preheating at 230° C. for 2 minutes (20 kg/cm$^2$), pressing at 230° C. for 2 minutes (200 kg/cm$^2$), and cooling at 20° C. for 5 minutes. Test pieces of 20 mm×120 mm were prepared from the obtained pressed sheet.

Using the prepared test pieces, discoloration and formation of blisters were examined in accordance with the same procedures as those conducted in Example 1. The results showed excellent fastness of color with little discoloration and excellent durability with respect to the formation of blisters.

Colored resin compositions for water distribution pipes were prepared by using BL-1 to BL-9 and BL-11 to BL-16 in place of BL-10 used in the above, and discoloration and formation of blisters were examined in accordance with the test method of resistance to water containing chlorine in accordance with the same procedures as those described above. The results of the tests showed excellent fastness of color and excellent durability with respect to the formation of blisters.

Example 5

The colored resin composition for water distribution pipes obtained in Example 1 was placed into a hopper of an extruder, and a blue water distribution pipe having an inner diameter of 26 mm and an outer diameter of 34 mm was prepared by melt extrusion of the colored resin composition at set temperatures of the cylinder and the die of 180 to 200° C. Portions of the prepared water distribution pipe were cut out to prepare test pieces. Using the prepared test pieces, discoloration and formation of blisters were examined in accordance with the same procedures as those conducted in Example 1. The results showed excellent fastness of color with little discoloration and excellent durability with respect to the formation of blisters.

The test of resistance to water containing chlorine in Examples was conducted in the following conditions:

| | |
|---|---|
| The concentration of chlorine in water: | 2,000 ± 100 ppm |
| The temperature of water containing chlorine: | 60 ± 1° C. |
| pH: | 6.5 ± 0.5 |
| The test time: | 336 hours |

What is claimed is:

1. A colored resin water distribution pipe formed of a colored resin composition which comprises a polyolefin resin as a main component and a blue fine powder pigment of at least one composite oxide which comprises two or more metal oxides and has a spinel crystal structure and a BET specific surface area of about 30 $m^2/g$ or more, wherein the blue fine powder pigment is covered with at least one covering material which is an inorganic compound.

2. The colored resin water distribution pipe according to claim 1, wherein the blue fine powder pigment of the composite oxide is treated mechanochemically by grinding in the presence of one or more compounds of elements other than metals of the metal oxides.

3. The colored resin water distribution pipe according to claim 1, wherein the blue fine powder pigment of the composite oxide is a composite oxide containing cobalt and aluminum as metals of the metal oxides.

4. The colored resin water distribution pipe according to claim 1, wherein the blue fine powder pigment of the composite oxide comprises one composite oxide or a mixture of two or more composite oxides which are selected from the group consisting of composite oxides containing cobalt and aluminum as metal components; composite oxides containing cobalt, aluminum and titanium as metal components; composite oxides containing cobalt, aluminum and chromium as metal components; and composite oxides containing cobalt, aluminum, chromium and titanium as metal components.

5. The colored resin water distribution pipe according to claim 1, wherein the blue fine powder pigment of the composite oxide is obtained by dissolving in water salts of metals constituting the composite oxide, forming coprecipitates of compounds comprising at least one of oxides, hydroxides and carbonates of the metals from the resultant solution in the presence of a precipitating agent, and baking the formed coprecipitates.

6. The colored resin water distribution pipe according to claim 1, wherein the blue fine powder pigment of the composite oxide is obtained by dissolving in water salts of metals constituting the composite oxide and urea, forming coprecipitates of compounds comprising at least one of the oxides, hydroxides and carbonates of the metals by heating the resultant solution, and baking the formed coprecipitates.

7. The colored resin water distribution pipe according to claim 1, wherein the polyolefin resin is a polyethylene resin.

8. The colored resin water distribution pipe according to claim 1, wherein the blue fine powder pigment is in an amount of 0.001 to 20 parts by weight per 100 parts by weight of the polyolefin resin; and the polyolefin resin is a homopolymer of ethylene or a block copolymer of ethylene and propylene containing 1 to 50% by weight of ethylene and 99 to 50% by weight of propylene and has a density of 0.91 to 0.98 g/cm$^3$ and a MFR of 0.01 to 10 g/10 minutes.

9. The colored resin water distribution pipe according to claim 8, wherein the blue fine powder pigment is in an amount of 0.01 to 10 parts by weight per 100 parts by weight of the polyolefin and the blue fine powder pigment is selected from the group consisting of pigment blue 28 and pigment blue 36.

10. The colored resin water distribution pipe according to claim 4, wherein the one or more elements other than the metals of the metal oxides are selected from the group consisting of aluminum, silicon, zinc, zirconium, titanium, tin, lanthanum, neodymium and praseodymiun.

11. The colored resin water distribution pipe according to claim 1, wherein the inorganic compound is selected from the group consisting of amorphous silica; a glass material having a low melting point; a compound selected from the group consisting of a hydroxide, an oxide, an insoluble salt and a hardly soluble salt of a metal selected from the group consisting of a metal of Group II of the Periodic Table selected from the group consisting of magnesium, calcium and zinc, a metal of Group III of the Periodic Table, a metal of Group IV of the Periodic Table selected from the group consisting of titanium, zirconium and tin and a metal of Group VII of the Periodic Table selected from the group consisting of iron and a rare earth metal selected from the group consisting of lanthanum, praseodymium and neodymium; and mixtures of said inorganic compounds.

12. The colored resin water distribution pipe according to claim 1, wherein the blue fine powder pigment of the composite oxide further comprises one or more elements other than a metal of the metal oxides, in the crystal structure.

13. The colored resin water distribution pipe according to claim 2, wherein the blue fine powder pigment of the composite oxide is a composite oxide containing cobalt and aluminum as metals of the metal oxides.

14. The colored resin water distribution pipe according to claim 12, wherein the blue fine powder pigment of the composite oxide is a composite oxide containing cobalt and aluminum as metals of the metal oxides.

15. The colored resin water distribution pipe according to claim 12, wherein the one or more elements other than a metal of the metal oxides are selected from the group consisting of aluminum, silicon, zinc, zirconium, titanium, tin, lanthanum, neodymium and praseodymium.

16. The colored resin water distribution pipe according to claim 2, wherein the blue fine powder pigment of the composite oxide comprises one composite oxide or a mixture of two or more composite oxides which are selected from the group consisting of composite oxides containing cobalt and aluminum as metal components; composite oxides containing cobalt, aluminum and titanium as metal components; composite oxides containing cobalt, aluminum and chromium as metal components; and composite oxides containing cobalt, aluminum, chromium and titanium as metal components.

17. The colored resin water distribution pipe according to claim 12, wherein the blue fine powder pigment of the composite oxide comprises one composite oxide or a mixture of two or more composite oxides which are selected from the group consisting of composite oxides containing cobalt and aluminum as metal components; composite oxides containing cobalt, aluminum and titanium as metal components; composite oxides containing cobalt, aluminum and chromium as metal components; and composite oxides containing cobalt, aluminum, chromium and titanium as metal components.

18. The colored resin water distribution pipe according to claim 4, wherein the blue fine powder pigment of the composite oxide is obtained by dissolving in water salts of metals constituting the composite oxide, forming coprecipitates of compounds comprising at least one of an oxide, a hydroxide and a carbonate of the metals from the resultant solution in the presence of a precipitating agent, and baking the formed coprecipitates.

19. The colored resin water distribution pipe according to claim 12, wherein the blue fine powder pigment of the composite oxide is obtained by dissolving in water salts of metals constituting the composite oxide, forming coprecipitates of compounds comprising at least one of an oxide, a hydroxide and a carbonate of the metals from the resultant solution in the presence of a precipitating agent, and baking the formed coprecipitates.

20. The colored resin water distribution pipe according to claim 2, wherein the blue fine powder pigment of the composite oxide is obtained by dissolving in water salts of metals constituting the composite oxide and urea, forming coprecipitates of compounds comprising at least one of an oxide, a hydroxide and a carbonate of the metals by heating the resultant solution, and baking the formed coprecipitates.

21. The colored resin water distribution pipe according to claim 12, wherein the blue fine powder pigment of the composite oxide is obtained by dissolving in water salts of metals constituting the composite oxide and urea, forming coprecipitates of compounds comprising at least one of an oxide, a hydroxide and a carbonate of the metals by heating the resultant solution, and baking the formed coprecipitates.

22. The colored resin water distribution pipe according to claim 2, wherein the polyolefin resin is a polyethylene resin.

23. The colored resin water distribution pipe according to claim 12, wherein the polyolefin resin is a polyethylene resin.

24. The colored resin water distribution pipe according to claim 11, wherein the metal is a metal of Group III of the Periodic Table and is aluminum.

25. The colored resin water distribution pipe according to claim 11, wherein the compound is a carbonate, phosphate or silicate of the metal.

* * * * *

UNITED STATES PATENT AND TRADEMARK OFFICE
CERTIFICATE OF CORRECTION

PATENT NO. : 6,730,727 B2
APPLICATION NO. : 10/021712
DATED : May 4, 2004
INVENTOR(S) : Kotaro Oshima et al.

It is certified that error appears in the above-identified patent and that said Letters Patent is hereby corrected as shown below:

Column 17,
Line 2, replace "claim 4" with -- claim 2 --.

Signed and Sealed this

Sixth Day of February, 2007

JON W. DUDAS
*Director of the United States Patent and Trademark Office*

UNITED STATES PATENT AND TRADEMARK OFFICE
CERTIFICATE OF CORRECTION

PATENT NO. : 6,730,727 B2  Page 1 of 1
APPLICATION NO. : 10/021712
DATED : May 4, 2004
INVENTOR(S) : Kotaro Oshima et al.

It is certified that error appears in the above-identified patent and that said Letters Patent is hereby corrected as shown below:

Column 17, line 7, replace "claim 4" with --claim 2--.

Column 17, claim 18, line 2, replace "claim 4" with --claim 2--.

Signed and Sealed this

Seventeenth Day of June, 2008

JON W. DUDAS
*Director of the United States Patent and Trademark Office*